United States Patent [19]

Maccianti et al.

[11] 4,429,361
[45] Jan. 31, 1984

[54] SEQUENCER MEANS FOR MICROPROGRAMMED CONTROL UNIT

[75] Inventors: Tiziano Maccianti, Pregnana Milanese; Vittorio Zanchi, Milan, both of Italy

[73] Assignee: Honeywell Information Systems Inc., Waltham, Mass.

[21] Appl. No.: 271,167

[22] Filed: Jun. 8, 1981

[30] Foreign Application Priority Data

Jun. 11, 1980 [IT] Italy ............................... 22732 A/80

[51] Int. Cl.³ .............................................. G06F 9/22
[52] U.S. Cl. .................................................... 364/200
[58] Field of Search ... 364/200 MS File, 900 MS File

[56] References Cited

U.S. PATENT DOCUMENTS 4,159,520  6/1979  Prioste .................................. 364/200

Primary Examiner—Gareth D. Shaw
Assistant Examiner—Ronni S. Malamud
Attorney, Agent, or Firm—George Grayson; Nicholas Prasinos

[57] ABSTRACT

Sequencer means for a microprogrammed control unit which develops consecutive addresses of microprograms, branches to subroutines with address saving and possible return to microprogram, as well as interrupting microprogram forcings with address saving of the interrupted microprograms.

In order to allow the double saving of microprogram and subroutine addresses in case of concurrent interruptions and branches, the sequencer means is provided with two address generation loops each including a register. The two loops have a common portion to which they accede through a multiplexer. The first loop is further coupled to a saving register stack.

While the first loop executes the saving of a microprogram address and the latching or a branch address received from the second loop, the second loop executes a first updating and related latching or interrupting microprogram address. During the following cycle, by command of the first microinstruction of the interrupting microprogram, the second loop performs a first updating and related latch of the interrupting microprogram address and the first loop saves into the register stack the branch address and performs a second updating and related latching of the interrupting microprogram address.

3 Claims, 11 Drawing Figures

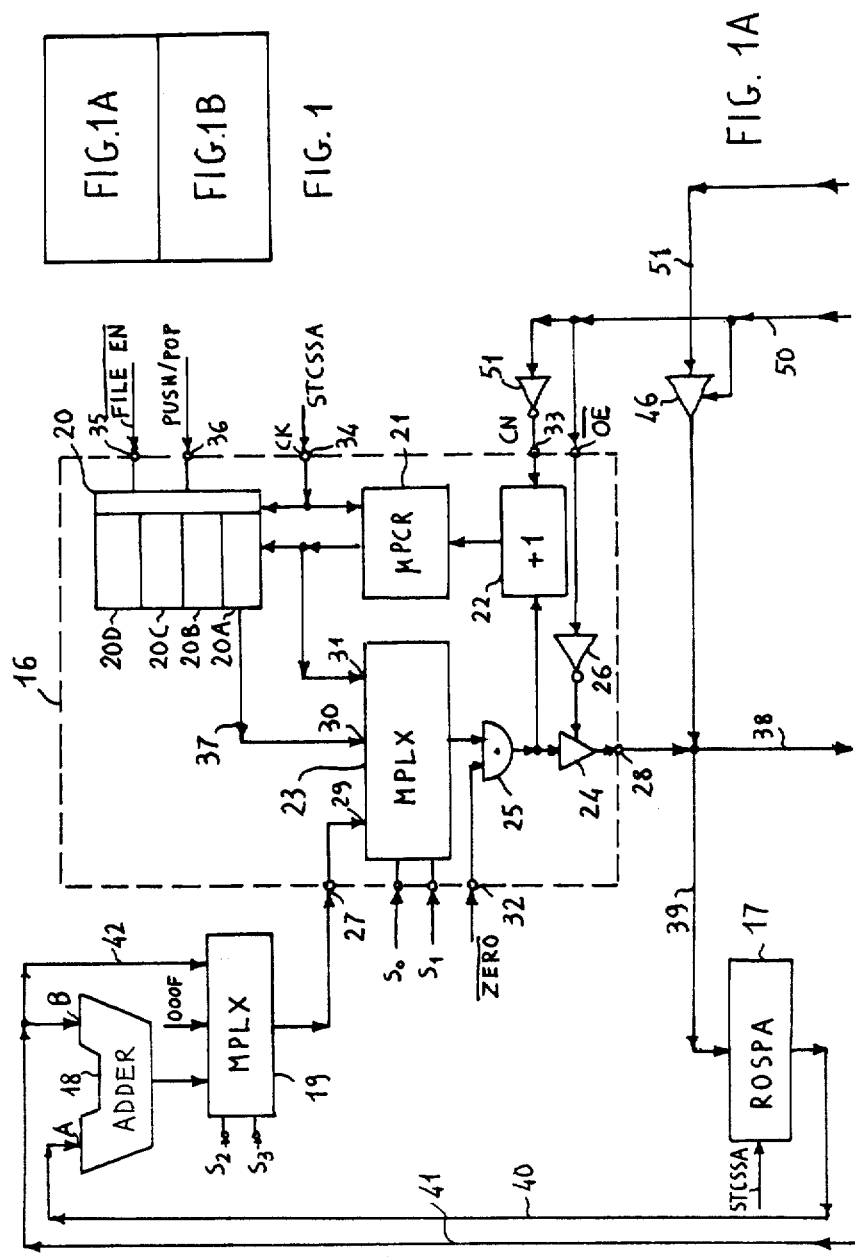

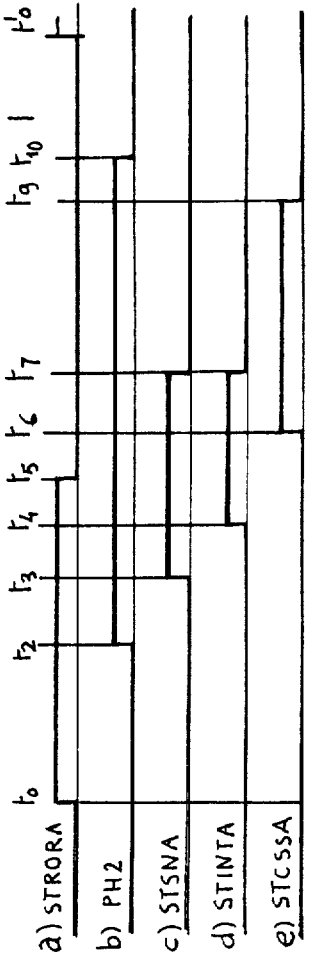

SEQUENCER MEANS FOR MICROPROGRAMMED CONTROL UNIT

BACKGROUND OF THE INVENTION

1. Field of the Invention

The present invention relates to data processing systems and more particularly to sequencers for microprogrammed control units. A sequencer is a means such as a set of circuits which determines the orderly read out of the microinstructions stored in a control memory.

2. Description of the Prior Art

It is known that data processing systems generally comprise a central unit, a main memory and a plurality of peripheral units connected to the central unit by means of a plurality of input/output channels for the exchange of information. The data processing system functions by processing data according to well defined program instructions. From the logical point of view the central unit comprises a control unit and an operative unit. The program instructions are interpreted and executed by means of microprograms, that is, microinstruction sequences that the control unit reads out from a control memory, one microinstruction at a time. Through suitable decoding the microinstructions generate a set of elementary commands, or microcommands, which cause the working of the several logic networks of the central unit in the manner required by the several program instructions. The operative processes performed by the system may be internal, that is, executed within the central unit with possible data exchange with the working memory, or external, that is, requiring the intervention of peripheral units.

In the second case they require an information transfer between some peripheral units and the central processing unit through input/output channels which connect the peripheral units to the central processing unit. The operative processes which develop within the peripheral units are not synchronized among themselves nor with the processes which develop within the central unit. Therefore, the whole system monitoring is not carried out by one program, univocally determined as to the timing, but it is rather performed with "interruptions" which require the execution of predetermined services. The "interruptions" can be caused by interrupt requests coming from peripheral units. Owing to an interrupt request, the central unit must interrupt the execution of an internal process in progress in order to execute the service required by the peripheral unit. As already mentioned, the "interruptions" are asynchronous events which may occur at any time and phase of the internal processes and which, generally, require the immediate interruption of the process in progress and the immediate execution of the required service. This is particularly true in case the interrupt requests come from fast peripheral units, such as disk units. In microprogrammed central units, this involves the interruption of microprograms in progress, through which the program instructions of the internal process are executed, and the start of microprograms executing the services required by the interruption. However, when an interruption occurs, information about the status of the internal interrupted process must be saved in order to resume such process once the required service has been executed.

This problem has been solved, in the prior art, by a multiplication of resources, particularly of registers, devoted to the storing of the microprogram address and determined states of the several overlapping processes. For instance, in U.S. Pat. No. 4,001,784, the control unit of a data processing system comprises three microprogram address registers. A first register is used to store the addresses of the microprogram which performs the program instructions of the internal processes; a second register is used to store the addresses of the microprogram executing the services required by interruptions have a certain priority level; a third register is used to store the addresses of the microprogram executing services required by interruptions have another priority level. Such structure allows the system to save microprogram addresses which, otherwise, would be lost owing to the interruptions, but it is not effective for the "saving" of addresses which should be saved within the same program. Such concept may be explained by referring to microprogram structures. It is known that the several program instructions of an operative process are executed by microprograms consisting of a set of microinstructions stored in a control memory. The microinstructions are preferably arranged in sequence to form a microprogram. In other words, a microinstruction stored in a memory address n is followed by the microinstruction stored in address n+1, and so on. In such a way, the memory addressing operation may be carried out by a network which increments the preceding address by one unit and the network is simple and inexpensive. However, such a design cannot always be utilized. First of all, during the execution of a microprogram, it is often necessary to choose between two possible paths according to particular conditions which occur and, for at least one of such paths, the sequential addressing is no longer possible. Further, the several microprograms, each one allowing for the interpretation of a well determined program instruction, may contain portions formed by identical microinstruction sequences. To avoid a memory waste, it is suitable to store such microprogram portions in the control memory only once so as to avoid duplications. Such microinstruction portions or sequences, identical for several microprograms, are named "subroutines" and it is clear that, for all the microprograms which use them, possibly with the exception of one, the access to such subroutines cannot follow the general criterium of sequential addressing. During the microprogram execution jump microinstructions, that is, unconditioned jump microinstructions, are therefore provided. The execution of such jump microinstructions causes the interruption of the sequential addressing operation and the jump to a microinstruction whose address is determined by the information contained in the jump microinstruction. If all of the subroutines were final portions of the microprograms, their execution would complete the microprogram which has called for one of them and there would be no further problems. On the contrary, a subroutine may also form an intermediate portion of a microprogram. It is therefore necessary, at the end of the subroutine, to return to the specific microprogram by which the subroutine has been called. The subroutine is not able by itself to specify to which of the several microprograms it has to go back to and which must be the subsequent return address in the microprogram basic sequence. Therefore, the return address necessary to go back to the main microprogram after the execution of a subroutine must be saved in a suitable register before starting the subroutine. Generally, the address to be saved is the jump microinstruction address, which calls for the subroutine, incremented by one. The last microinstruction of the subroutine must contain a command information which controls the return, that is, the addressing of the subsequent microinstruction by using the saved address. However, it cannot contain information concerning the specific register where the address has been saved, but the read out from the register of address to be used must be automatically obtained. Generally, a subroutine may also contain, in its turn, microprogram portions common to other subroutines or microprograms, which will be considered subroutines of second level or of subsequent level. It will be therefore necessary to provide a number of address saving registers equal to the subroutine levels which are foreseen and an automatic mechanism of return, that is, of selection of one of these registers. A particularly effective solution of such problem is described in U.S. Pat. No. 3,909,797. According to the solution suggested by such patent, the registers devoted to save the several return addresses from a stack where the output order of the information stored therein is opposite to the input order, that is, information is handled on a last in, first out basis (LIFO). In other words, the last recorded information is always the first one to be read out. This allows the "nesting" of subroutines of different levels, the one inside the other, and the orderly return to the several subroutines up to the internal computation microprogram. However, such solution does not consider the problems rising from a microprogrammed system where a microprogram interruption may be caused by external events. In fact, the above solution does not satisfy the requirements of a control unit which jointly uses microprograms comprising common subroutines and interruption mechanisms.

One solution to such problem may be the combination of the addressing circuits described in the two mentioned patents, that is, a number of register stacks may be provided equal to the microprogram levels which may be executed, suspended or started owing to an interruption. Such a solution would however be complex and expensive.

SUMMMARY OF THE INVENTION

The present invention overcomes these disadvantages. According to the invention, a unique sequencer is provided for a microprogrammed control unit. The sequencer comprises one register stack, which includes a loading/unloading mechanism of the LIFO type (last in, first out) and is used to store both addresses of return from subroutines within the same microprogram, and microprogram addresses which must be saved owing to an interruption. The sequencer further comprises a +1 counter or incrementer and a summing unit, as well as a present address register and a microprogram counter register. The sequential increment of the addresses is obtained through a looped communication path which comprises a counting network and a microprogram counter in series. Such path comprises an input/output node for loading/unloading information from the stack. The non-sequential increment of the addresses, that is, the jump (absolute or relative) to a new address, is obtained through two looped communication paths, one of which comprises the present address register and the summing unit, and the other path comprises a control memory output register and, in case, the summing unit. All these paths have a common portion accessed through a multiplexer. The essential problem to be solved in such a system is the elimination of interferences among several different savings caused by the particular time at which the interruption occurs. In fact, if the interruption occurs during a conditioned jump microinstruction, two addresses are to be saved. This is allowed in the subject invention by providing that the first microinstruction of the interrupt microprogram must be a conditioned jump microinstruction with save of address. By this, the further advantage is obtained of having a homogenous format to the program microinstructions; the saving function, specified by a predetermined microinstruction bit, is only present in the jump microinstructions where it may be necessary. Such function is not present, in any case, in the sequential microinstructions where it would not be useful and where the utilization of a bit with such a specific use is inconsistent with the need to assign a different meaning to the several microinstruction bits. These and other features of the invention will appear more clearly from the following description of a preferred embodiment of the invention and from the enclosed drawings where:

BRIEF DESCRIPTION OF THE DRAWINGS

FIG. 1 shows how FIGS. 1A and 1B are to be juxtaposed for their reading.

FIGS. 1A and 1B jointly show a microprogrammed control unit comprising a sequencer according to the present invention.

FIG. 2 shows the timing diagrams of some timing signals used in the unit of FIGS. 1A and 1B.

FIGS. 3A through 3E show the format of the microinstructions used in the control unit of FIGS. 1A and 1B.

DESCRIPTION OF THE PREFERRED EMBODIMENT

Figure 1B:
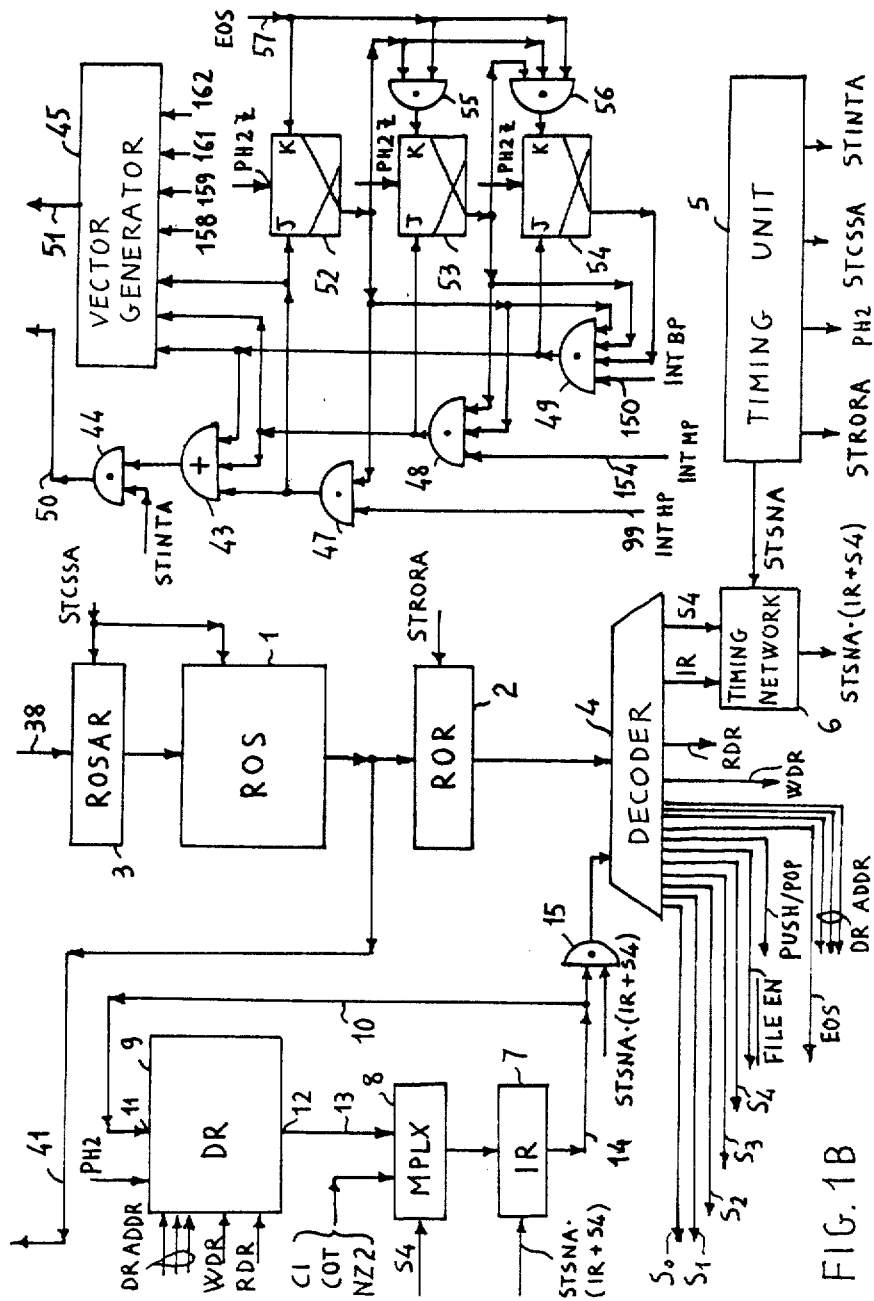

FIGS. 1A and 1B jointly show a microprogrammed control unit comprising a sequencer according to the present invention. The microprogrammed control unit of FIGS. 1A and 1B may be associated to central processing units having a different architecture and which are not described herein because they are beyond the scope of the present invention. Particularly, it may be used in the data processing system described in U.S. Pat. No. 4,001,784 to which reference is made as an integral part of the present description in order to have a complete understanding of the whole central processing unit. In such a central processing unit, FIGS. 1A and 1B of the present invention integrally replace the circuits shown in FIGS. 8a and 8b of the mentioned patent.

The control unit substantially comprises (FIG. 1B):

a control memory or ROS 1 where the microprograms are stored;

an output register 2 (ROR) for ROS memory, receiving and storing at each machine cycle a microinstruction read out from ROS memory 1;

an addressing register ROSAR 3 having its outputs connected to the address inputs of ROS memory 1 and receiving and storing at each machine cycle a ROS address;

a microinstruction decoder 4 which receives on its inputs the microinstruction contained in register ROR 2 and decodes it providing on its outputs elementary commands or microcommands. Such decoder may be of the type described in the U.S. Pat. No. 3,812,464, which decodes the microinstructions according to a field of the same, the field having variable length and being named function code. FIG. 1B shows, in output from decoder 4, only the microcommands necessary for the understanding of the invention and precisely $S_0$, $S_1$, $S_2$, $S_3$, $S_4$, FILE EN, PUSH/POP, RDR, WDR, DR ADDR, EOS, IR;

a timing unit 5 which cyclically generates timing signals for each machine cycle. Such timing signals are forwarded to the several elements forming the central unit for timing them. FIG. 1B shows in output from unit 5 the signals necessary for understanding the invention, and precisely: STRORA, PH2, STCSSA, STINTA, STNSA;

a timing network 6 which receives on its inputs microcommands decoded by decoder 4 and timing signals produced by timer 5. Network 6 performs logical AND operations among timing signals and microcommands, and supplies on its outputs suitable timed microcommands during each machine cycle.

In FIG. 1B only signal STNSA (IR + $S_4$) is shown in output from network 6, which signal is necessary for a full understanding of the invention;

the control unit further comprises an index register IR 7 intended to receive and to store a particular machine status or condition, as for instance the occurrence of an input (CI) or an output (COT) carry due to arithmetical or shift operations, or the occurrence of conditions, detected by comparison and indicated by a positive comparison signal NZ2.

These statuses received from other central unit elements (described, for instance, in the mentioned U.S. Pat. No. 4,001,784) are sent to inputs of register IR7 through a two path multiplexer circuit 8. A bank of registers DR9 is further provided, which may be addressed by microcommands. The content of register IR7 may be saved in such bank and from there the previously saved statuses may be read out and reloaded in the index register IR7. To this purpose, the outputs of index register IR7 are connected through a channel 10 to inputs 11 of register bank 9, and the outputs 12 of register bank 9 are connected, through channel 13, to a set of inputs of multiplexer 8 which may selectively transfer to index register 7 the statuses read out from bank 9 or the statuses which occur during machine cycle. The outputs of index register 17 are further connected, through a channel 14 and a group 15 of enabling AND gates, to decoder 4, to provide it with information which adds to the one obtained from the read out microinstruction.

The control unit sequencer means, that is, the circuit set devoted to the control memory 1 addressing, comprise:

a sequencing unit 16 of the type described in the already mentioned U.S. Pat. No. 3,909,797. Such unit is, for instance, available as an integrated circuit manufactured by the U.S. firm AMD and marketed with code AM2911;

an auxiliary register 17 (ROSPA) intended to contain the address of the microinstruction in the course of execution;

a summing network 18;

a multiplexer circuit 19.

The sequencer unit 16 substantially comprises:
a stack 20;

a microprogram counter register $\mu$ PCR 21;

a +1 counter or incrementer 22;

a multiplexer circuit 23;

a set 24 of tristate output control circuits;

a set 25 of AND gates;

an inverter 26 connected to the control input of the tristate set 24.

The sequencing unit 16, in the whole, has a set 27 of address inputs (by connecting in parallel a suitable number of integrated circuits AM 2911, any desired parallelism can be obtained), a set 28 of address outputs and a certain number of control inputs. Two pins $S_0$ and $S_1$ are used to control multiplexer 23. Multiplexer 23 is provided with three sets of inputs and transfers the signals present on one of the three input sets to its output depending on the logical combination of the signals present on $S_0$, $S_1$ inputs. An input set 29 of multiplexer 23 is connected to input set 27. A second input set 30 is connected to outputs of register stack 20 and a third input set 31 is connected to the outputs of microprogram counter register $\mu$ PCR 21. Outputs of $\mu$ PCR 21 are further connected to the inputs of register stack 20. Outputs of multiplexer 23 are connected to inputs of AND gate set 25, the AND gates being enabled by a signal $\overline{ZERO}$ at logical level 1 applied to a control input 32. The outputs of AND set 25 are connected to the inputs of the tristate output set 24 and to the inputs of incrementer 22. The tristate output set 24 is enabled to the information transfer by a command signal applied to an input pin $\overline{OE}$ connected to the enabling inputs of tristates 24 through inverter 26. Incrementing counter 22 is controlled by a signal CN applied to input 33.

When CN is at logical level 1 counter 22 increments by one unit the binary information applied to its inputs and transfers it on its outputs; when CN = 0 the binary information applied to inputs of counter 22 is transferred unchanged. The loading of register $\mu$ PCR 21 and of stack 20 is controlled by a timing signal CK applied to an input 34.

When the CK signal rises from 0 to 1, register $\mu$ PCR 21 is loaded and, in case, stack 20 is enabled too. Stack 20 comprises 4 cascade connected registers 20A, 20B, 20C, 20D and its operation is controlled by two signals FILE EN and PUSH/POP applied to two control inputs 35 and 36 respectively. When $\overline{FILE\ EN}$ = 1, no operation is performed by stack 20. When $\overline{FILE\ EN}$ = 0, stack 20 operates according to signal PUSH/POP. In case PUSH/POP = 1, the information present on the output of $\mu$ PCR 21 is stored in register 20A with the rising edge of signal CK (it is therefore available on inputs 30 of multiplexer 23 through channel 37). At the same time, the information previously stored in registers 20A, 20B, and 20C is transferred or pushed into registers 20B, 20C, and 20D respectively.

In case PUSH/POP = 0, the information stored in registers 20D, 20C, and 20B is transferred or popped into registers 20C, 20B, and 20A respectively, with the rising edge of signal CK.

The information present, at this point, in register 20A is directly available on inputs 30 of multiplexer 23 through channel 37. Outputs 28 of sequencing unit 16 are connected, through channel 38, to the inputs of the memory addressing register 3 (ROSAR). Such outputs are further connected, through channel 39, to the inputs of present address register 17 whose outputs are connected, through path 40, to a first input set A of summing network 18, which receives, through path 41, on a second input set B a certain number of microinstruction bits read out from ROS memory 1. The outputs of summing network 18 are connected to a first input set of multiplexer 19, which receives on a second input set, through paths 41, 42, a certain number of bits read out from ROS memory 1. A third input set of multiplexer 19 receives a fixed binary addressing code, for instance 000F. The outputs of multiplexer 19 are connected to inputs 27 of sequencing unit 16. The selection of the input set is determined by the logical level of the two signals of control inputs $S_2$, $S_3$.

The sequencer is completed by some circuits for connection to a logical priority network intended to detect the interruptions coming from several channels connecting peripheral units. The logical priority network may be of the type described and shown in FIG. 7 of the mentioned U.S. Pat. No. 4,001,784. Such priority network emits on one of three output leads 99, 150, 154 an interrupt signal having high, low, intermediate priority respectively. On one of four leads 158, 159, 161, 162, it further emits a signal at logical level 1 which indicates which is the channel sending the interruption. For instance, a channel 1 is associated to lead 158, a channel 2 to lead 159, and so on. One or more peripheral units will be connected to each channel through a peripheral adapter or peripheral control unit.

Turning to FIG. 1B, leads 99, 150, 154 are connected to the inputs of an OR gate 43, each one through AND gates 47, 48, 49 having two, three, four inputs respectively. OR 43 output is connected to an input of a two input AND gate 44; AND gate 44 is controlled by a cyclical timing signal STINTA (INTERRUPTION STROBE) applied to its second input. The output of AND gate 44 is connected, through lead 50, to input $\overline{OE}$ of sequencing unit 16. When $\overline{OE}$ is at logical level 1, the outputs 28 of the sequencing unit 16 are locked (in high impedance output status). Output of AND gate 44 is further connected to control input CN of sequencing unit 16 through a NOT 51 and to the control input of a tristate set 46. Tristate set 46 receives in input an interruption vector (that is, the first microinstruction address of the microprogram called for by the interruption) and transfers such vector on channel 38 and on channel 39 when it is enabled by AND gate 44 with output at logical level 1.

The interruption vector is generated by a logical network 45 (VECTOR GENERATOR) which suitably codes the input signals, constituted by the interruption signals at different priority levels (received on leads 99, 150, 154, through AND 47, 48, 49) and by the interrupting channel signals received on leads 1518, 159, 161, 162.

The circuital structure of logical network 45 is beyond the scope of the invention. This network is substantially a coding network which generates an address binary output code on channel 51 depending on the binary code received on its inputs (7 bits, two of which are at logical level 1). In alternative, in order to have an higher flexibility, the interruption vector generator can be constituted by a coding network which generates an addressing binary output code which addresses, in its turn, an auxiliary memory where the interruption addresses are stored.

The vector generator outputs are connected to the inputs of tristate set 46 through channel 51. AND gates 47, 48, 49 together with JK flip-flops 52, 53, 54 and with two AND gates 55, 56 (FIG. 1B) provide suitable timing of interrupt signals and interrupt masking if a higher priority interruption was already in progress. Output of AND gate 47 is connected to J input of flip-flop 52; output of AND gate 48 to J input of flip-flop 53 and output of AND gate 49 to J input of flip-flop 54. The inverted output of flip-flop 53 is connected to an input of AND gates 48, 49. The inverted output of flip-flop 54 is connected to an input of AND gate 49. The inverted output of flip-flop 52 is further connected to an input of AND gates 55, 56 and the inverted output of flip-flop 53 is connected to an input of AND gate 56. A microcommand EOS (end of service) is applied to K input of flip-flop 52 through lead 57 and to an input of AND gates 55, 56 which have their outputs connected to K input of flip-flops 53, 54 respectively. Flip-flops 52, 53, 54 are set/reset according to the logical level on their J, K inputs, by the falling edge of a timing signal PH2 applied to their clock input. The set of such flip-flops determines the interruption level which is in progress.

The time operation of such network will be explained later on. Before explaining the operation of the sequencer object of the present invention, a brief description is made about the system timing and the organization of the microinstructions controlling it with particular reference to the sequencer working.

FIG. 2 shows, in timing diagram, the signals produced by timing unit 5 which are useful for understanding the sequencer working. A machine cycle consists in a time interval from time $t_0$ to time $t_0^1$ which is the beginning of the subsequent cycle. A machine cycle start is determined by a timing signal STRORA (diagram a) which rises to logical level 1 at time $t_0$ and remains at logical level 1 up to time $t_5$. The rising edge of STRORA is used as strobe signal for register ROR 2. At a time $t_2$ a second signal PH2 (diagram b) rises to logical level 1 and remains at such level up to time $t_{10}$. The rising edge of PH2 is used as strobe signal for register stack 9, while the falling edge of PH2 is used as clock signal for flip-flops 52, 53, 54. At a time $t_3$ a third signal STSNA (diagram c) rises to logical level 1 and remains at such level up to time $t_7$. The rising edge of STSNA is used as timing signal applied to network 6. When one of microcommands IR or S4 is present, it produces a timed microcommand STSNA (IR+S4) used as strobe signal for register 7. At an instance $t_4$ a fourth signal STINTA (diagram d) rises to logical level 1 and remains at such level up to a time $t_7$. Such signal is used to enable AND gate 44. At a time $t_6$ a fifth signal STCSSA (diagram e) rises to logical level 1 and remains at such level up to tie $t_g$. The rising edge of STCSSA is used as strobe signal for register 3, memory 1, register 17 and sequencing unit 16. Times $t_0, t_2 \ldots t_{11}$, orderly follow in the time.

The organization of the microinstructions is now considered, such microinstructions controlling during each machine cycle the operation of the sequencer, the control unit and the whole data processing central system.

FIGS. 3A, 3B, 3C, 3D, and 3E show the format of the several basic types of microinstructions, that is, the meaning assumed by the several bits forming each microinstruction. Essentially the microinstructions are of two types: OPERATIVE microinstructions (FIGS. 3A, 3B) and JUMP microinstructions (FIGS. 3C, 3D, 3E). The OPERATIVE microinstructions may be TRANSFER microinstructions (FIG. 3A TRANSF.) or LOGIC/ARITHMETIC operative microinstructions (FIG. 3B LOGIC/ARITM). A transfer microinstruction comprises several fields of bits having a precise meaning. A first field (bits 0-3), named FC or FUNCTION CODE, characterizes the microinstruction and assigns to the subsequent fields a determined meaning. Decoding network 4 (FIG. 1B) decodes the function code and generates output signals. The output signals from decoding network 4 control the several registers and the several gates constituting the system in order to perform the function defined by the microinstruction bits. A second field (bits 04-07), named BLOCK SEL or block selector, defines which are the system elements involved in the transfer. For instance, the transfer microinstruction can control the information transfer from a register of a bank to a register of another bank, or from the output register of the working memory to an output register of channel interface, etc. (such considerations are referred to the specific architecture described in the already mentioned U.S. Pat. No. 4,001,784). A third field (bits 08-13), named ADDR A, defines the specific address of one of the registers involved in the transfer, for instance, one of the registers of a bank or one of the output registers. A fourth field (bits 14-21), named ADDR B, defines the specific address of the other register involved in the transfer. A fifth field (bit 22), named DIR, defines the transfer direction, that is, if the transfer has to occur from the location defined by ADDR A to the one defined by ADDR B or vice versa. Other fields (bits 23-31) are used for control functions and as parity check bits.

FIG. 3B shows the format of a LOGIC/ARITHMETIC operative microinstruction. Also in this case, there is a field (bits 0-3) with meaning of function code FC, a field (bits 18-20) with meaning of address of the register (SOURCE) containing the operand (the operator may be stored in a fixed register), a field (bits 21-23) which defines the Logic/Arithmetic operation to be executed (OP SEL), a field (bits 24-26) which defines the address of the register where the operation result is to be stored, and a field IR (bit 29) which defines whether the index register is to be updated with the conditions of carry/overflow/etc., which have occurred owing to the operation.

Other fields, not specifically shown, may assume suitable meanings. The operative microinstructions do not contain, contrarily to the jump ones, any useful information defining the subsequent microinstruction address. The subsequent microinstruction will be therefore called for by the sequencer through the increment by one unit of the previous operative microinstruction address.

FIG. 3C shows the format of an absolute jump microinstruction (ABS.JUMP). Such kind of microinstruction specifies the address of the following microinstruction itself. A first field (bits 0-5) constitutes the function code. A second field (bit 06), named SAVE, defines whether the progressive address of the jump microinstruction in progress, incremented by one unit, must be saved into stack 20 in order to be called for later on; if bit 06 is at logical level 1, the saving operation occurs. A third field (bits 07-22), named ADDR, constitutes the absolute address of the subsequent microinstruction. Other fields, not specifically shown, may assume suitable meanings.

FIG. 3D shows the format of a relative conditioned jump microinstruction (REL. COND. JUMP). Such kind of microinstruction, having a generical address N, defines that the subsequent microinstruction must be the one having address N+1 if a condition specified by the same microinstruction is not verified, and must be the one having address N+K if the condition specified by the same microinstruction is verified. The displacement K is provided by the same microinstruction. Also in this case, a first field (bit 0-5) defines the function code. A second field (bit 06), named SAVE, defines whether the progressive address of the jump microinstruction in progress, incremented by one unit, must be saved into stack 20 in order to be recalled later on. A third field (bit 07), named C DR, defines whether the condition to be verified is contained in a DIRECT REGISTER. A fourth field (bits 08-16) defines which is the condition COND to be verified. A fifth field (bits 17-29) defines the displacement K.

At last FIG. 3E shows the format of a relative unconditioned jump microinstruction (REL. UNC. JUMP), with possible operations of saving and of return from subroutine and with possible priority change. Such microinstruction is typical for the start of a subroutine or of an interrupting microprogram and for the return from a subroutine or from an interrupting microprogram. Also in this case, a first field (bits 0-05) defines a function code and a second field (bit 06), named SAVE, indicates if the progressive address of the jump microinstruction in progress, or more generally, the address present in register ROSPA, incremented or not by one unit, must be saved into stack 20 in order to be recalled later on. A third field (bit 07), named RD DR, defines if the content of a DIRECT REGISTER must be read out and transferred into register IR 7. A fourth field (bit 08), named WR DR, defines if the content of register IR 7 must be saved by writing it in a DIRECT REGISTER. A fifth field (bit 09), named RET, defines if the microinstruction is a microinstruction of return from a subroutine or from an interrupting microprogram; in this last case a pop operation of stack 20 is commanded and the subsequent microinstruction address is read out from stack 20. A sixth field (bits 10-13), named DR ADDR, defines which DIRECT REGISTER of stack 9 is interested in the transfer (read or write). A seventh field (bit 14), named PC (PRIORITY CHANGE), defines if a priority change must occur, for instance, because a microprogram of interruption treatment ends. An eighth field (bit 17-29) gives the jump displacement K. Once described, the format of the microinstructions used to control the central system and the sequencer object of the invention, as well as the essential timings of a machine cycle, the sequencer working may be examined in the different possible cases.

1 - Initialization

To initialize the system it is enough to force by a start push button (not shown), which activates at the same time a machine cycle, a logical level 0 on input 32 which locks AND gates 25. An assumption is made that no external interruption be present, a start address 0 is forced on channels 38 and 39 and is applied to inputs of incrementer 22. Such address is loaded into registers 17 (ROSPA) and 3 (ROSAR) by the rising edge of signal STCSSA, while address +1 is loaded into counter μ PCR 21.

A read operation of ROS memory 1 starts, at the end of which the microinstruction of address 0 is available on the output of such memory. At the subsequent cycle start (time $t_0$) the read out microinstruction is loaded into register ROR 2 by the rising edge of timing signal STRORA, so that the microinstruction is available on inputs of decoder 4 and a set of microcommands is produced on the outputs of decoder 4. Such microcommands allow the microinstruction execution during the cycle. Supposing that the read out microinstruction is an operative microinstruction, it causes an address sequential updating.

2 - Address sequential updating:

Microcommands $S_0$ and $S_1$ at logical level 0 are two of the microcommands generated by decoder 4 and they are available from time $t_0$. Such microcommands select input set 31 of multiplexer 23, so that the new address "1", present in register $\mu$ PCR 21, is transferred on channels 38 and 39 and applied to inputs of incrementer 22. At instant $t_6$ the new address "1" is loaded into registers 17 and 3 by the rising edge of signal STCSSA, and an address incremented by one unit, that is "2", is loaded into register $\mu$ PCR 21.

Generally, if at instant $t_0$ of any cycle, an operative microinstruction of address N is loaded into register ROR 2, this means that during the previous cycle address N was loaded into registers ROSPA 17 and ROSAR 3 and that address N+1 was loaded into register $\mu$ PCR 21, all these loadings occurring at a time $t_6$ by rising edge of timing signal STCSSA.

During the cycle within which the microinstruction of address N is executed, the new address N+1 is transferred by the rising edge of STCSSA from $\mu$ PCR 21 to channels 38, 39 through multiplexer 23, AND gates 25, tristate circuits 24, and then loaded into registers ROSPA and ROSAR.

At the same time the content of $\mu$ PCR 21 is incremented to N+2.

3 - Forcing to microprogram routine or error treatment.

It is to be noted that if the operative microinstruction in progress is of the logic/arithmetic kind, field IR (bit 29) may define, if at logical level 1, that register IR 7 must be loaded with the conditions verified during the execution of such microinstruction. Such conditions, coming from a condition check network, not shown, are transferred through multiplexer 8 (enabled by a microcommand $S_4$) to inputs of register 7 and loaded into it by the rising edge of a signal STSNA.IR which is obtained as a logical AND of microcommand IR with timing signal STSNA. Register IR7 is therefore loaded at time $t_3$ and its outputs are connected, through AND gates 15 enabled by STSNA.IR, to channel 14 which supplies decoding network 4. Some microcommands generated by such network are therefore modified. Particularly, if among the conditions received by register IR 7 an ERROR condition is present, microcommands $S_0$ $S_1$ assume a logical condition which selects input set 29 of multiplexer 23 and microcommands $S_2$ $S_3$ assume a logical level which selects inputs 000F of multiplexer 19. So, starting from time $t_3$, when STSNA signal rises (or better with a certain delay due to the signal proposition time, but however before time $t_6$) an address 000F is forced, through multiplexer 19, inputs 27 and 29, multiplexer 19, inputs 27 and 29, multiplexer 23, gates 25, tristates 24, on channels 38 and 39. A start address 000F of an error treatment routine is therefore loaded into registers 17 (ROSPA) and 3 (ROSAR) by timing signal STCSSA. At the same time the address 000F+1 is loaded into register $\mu$ PCR 21, while the previous address contained into $\mu$ PCR 21 is lost. In fact, when an error occurs, it is not useful to save information in progress (microprogram addresses included) in order to resume operations which have not been correctly executed.

4 - Absolute jump with address saving.

Assumption is made that, during a general machine cycle n—1, an absolute jump microinstruction of address N is addressed. At time $t_6$ of cycle n—1 registers ROSPA 17 and ROSAR 3 are loaded with address N and register $\mu$ PCR 21 is loaded with address N+1. At time $t_0$ of cycle n, the microinstruction of address N is available in register ROR2 and is decoded.

Field 07-22 defines a new address NA to be used to address the subsequent microinstruction: such bit field is transferred through channels 41, 42 to an input set of multiplexer 19. The microinstruction decoding produces a group of microcommands $S_2$, $S_3$ at logical level such as to select the input set of multiplexer 19 connected to channel 42, as well as a set of microcommands $S_0$, $S_1$ which select input set 29 of multiplexer 23. Therefore, new address NA is transferred on channels 38, 39 and to inputs of incrementer 22. Besides, if bit 06 (SAVE field) is at logical level 1, two microcommands FILE EN at logical level 0 and PUSH/POP at logical level 1 are generated; such microcommands are applied to inputs 35, 36 of the sequencing unit 16 respectively. At time $t_6$ of cycle n, new address NA is loaded into registers ROSPA 16 and ROSAR 3, while address N+1 contained in $\mu$ PCR 21 is loaded into register 20A of stack 20. At the time, address NA+1, present on outputs of network 22, is loaded into register $\mu$ PCR 21. The new microinstruction, which will be recalled, will therefore be the one of address NA, while the sequential address N+1 is saved into stack 20 and will be recalled later on. If the microinstruction of address N was a jump microinstruction without address saving (that is, bit 06 SAVE was at logical level 0), the saving operation would not have occurred.

5 - Relative conditioned jump.

Assumption is made that, during a general machine cycle n—1, a relative conditioned jump microinstruction of address N is addressed. At time $t_6$ of cycle n—1, an address N is loaded into registers ROSPA 17 and ROSAR 3 and an address N+1 is loaded into register $\mu$ PCR 21. At time $t_0$ of cycle n, the microinstruction of address N is available into register ROR 2 and is decoded. Field 17-29 defines a jump displacement K to be used to address the subsequent microinstruction if a determined condition is verified. Such bit field is transferred, through channel 41, to input set B of summing network 18 which receives on its input set A the address N coming from ROSPA through channel 40.

The microinstruction decoding produces a group of microcommands: microinstruction bit 07 defines whether the condition to be examined is contained in a register DR of bank 9, whose address is expressed by the field of bits 10-13. In the affirmative case, addressing microcommands of bank 9 and a read microcommand RDR are generated by network 4. Timing signal PH2 therefore controls the reading of the selected register. At time $t_2$, the content of the selected register is available on output set 12. The selected register content defines the condition to be examined and is transferred through multiplexer 8, controlled by microcommand $S_4$ at suitable logical level, to inputs of register IR 7. At time $t_3$, by the rising edge of STSNA, the content read out from the selected register is loaded into register IR 7 and transferred then through AND gate 15 and channel 14, to decoding network 4.

Such network selects in the contained information the condition to be verified and, if this last one is verified, it generates a set of microcommands $S_2$, $S_3$ at a logical level such as to select the input set of multiplexer 19 which is connected to the output set of summing network 19, and a set of microcommands $S_0 S_1$ which select input set 29. Besides, if bit 06 is at logical level 1 (that is, the command of saving into stack is present), microcommands $\overline{\text{FILE EN}}$ at logical level 0 and PUSH/POP at logical level 1 are also generated. So, at time $t_6$, address N+K is loaded into ROSPA 17 and ROSAR 3, while address N+1 contained in µ PCR 21 is transferred to register 20A of stack 20 and address N+K+1 is loaded into µ PCR 21. If the condition had not been verified, no saving would have occurred and the address loaded into ROSPA 17 and ROSAR 3 would be N+1, while the address contained in µ PCR 21 would be N+2.

6—External interruption.

Assumption is made that an interruption request is presented by a peripheral unit of the system. Such completely asynchronous event is considered at a suitable time of a machine cycle; it is recognized only if there are not interruption requests of higher priority or interruption requests in progress having the same priority level and is presented to the central unit in order to develop an interruption execution microprogram.

These operations are performed by an interface priority network, not shown because it is beyond the scope of the invention. An embodiment of such network is described in the already mentioned U.S. Pat. No. 4,001,784.

For the invention purposes it suffices to point out that such network provides leads 99, 154, 150, with signals indicating an interruption having high, means, low priority and leads 158, 159, 161, 162 with signals indicating an interrupting channel. The number of such leads is variable and it depends on the number of priority levels that the system is able to consider and on the number of interface channels.

FIG. 1B is considered and assumption is made that an intermediate priority interruption occurs on lead 154 during the initial phase of a machine cycle and that, at the same time, a signal of interrupting channel is applied to lead 158. It is further to be supposed that no treatment of high or intermediate priority interruption is in progress, that is, flip-flops 52 and 53 are reset. The interruption is therefore transferred through AND 48, is applied to vector generator 45, and through OR 43, is applied to an input of AND gate 44. At time $t_4$, the interruption is transferred to lead 50 by the rising edge of STINTA and it enables tristate circuits 46, while NOT 51 applies a logical level 0 to input CN. Therefore, an interrupting microprogram address MI, coming from network 45 as interrupting vector and present on channel 51, is applied to channels 38 and 39. The interruption signal is present on lead 50 for a suitable portion of the cycle, that is, from time $t_4$ (signal STINTA rising to 1) up to time $t_7$, when signal STINTA falls to logical level 0. When the interruption is received, the sequencer is in a state determined by the microinstruction in progress. Assumption is made that an operative microinstruction of address N is in progress. It is therefore clear that address N is contained in registers ROSAR 3 and ROSPA 17 and an address N+1 is contained in register µ PCR 21. The several commands $S_0, S_1, S_2, S_3$ enable multiplexers 19 and 23 to transfer address N+1 to output set 28 of sequencing unit 16 to inputs of incrementer 22. But, at time $t_4$, the output tristate gates 24 are locked by the interruption and a signal CN=0 is applied to input 33. So, at instant $t_6$, address N+1 is not loaded into registers ROSPA and ROSAR by the rising edge of STCSSA. Instead of it, address MI of interrupting microprogram is loaded. At the same time address N+2 is not loaded into register µ PCR 21, but, instead of it, N+1 is loaded again (because CN=0). Microinstruction MI is therefore addressed and it is executed during the subsequent cycle.

According to an aspect of the invention, such microinstruction is a jump microinstruction and not an operative microinstruction and it allows the saving of the machine states existing before the interruption. Such microinstruction has the format shown in FIG. 3E. A first field (bits 0-5) constitutes the function code. A second field (bit 06), named SAVE, in this case at logical level 1, defines that the pre-existent microprogram address must be saved. A third field (bit 07), named RDR, is not used in this case and is at logical level 0. A fourth field (bit 08), named WDR, is at logical level 1 and determines that the information contained in register IR 7 must be saved into a DIRECT REGISTER. A fifth field (bit 09), named RET, is in this case at logical level 0 and is not used. A sixth field (bits 10-13), named DR ADDR, determines the DIRECT REGISTER address to be used for the writing operation specified by bit 08. A seventh field (bit 14), named PC, is in this case at logical level 0 and is not used. An eighth field (bits 17-29), named K, defines the jump displacement K to be used to establish the subsequent microinstruction address. Therefore, in case of interruption, the called microinstruction of address MI (specified by the interruption vector) contains the following useful information:

A. SAVE=1 to save the pre-existent address.
B. =WDR 1 to save the content of register IR 7 into a DIRECT REGISTER.
C. DR ADDR:DIRECT REGISTER address.
D. K:jump displacement necessary to generate the subsequent address. Such quantity may suitably be equal to 1.

All this information is available at time $t_0$, that is at the machine cycle start. DR ADDR information allows the selection of a register of bank 9. Information WDR=1 together with signal PH2 allows the controlling of a writing operation at instant $t_4$: the content of register IR 7 is loaded into the selected DR register through channel 10 and inputs 11. The function code specifies that the microinstruction is a relative unconditioned jump microinstruction and generates, when it is decoded, signals $S_2, S_3$ such as to select the input set of multiplexer 19 which is connected to the output set of summing network 18. It also generates signals $S_0, S_1$ such as to select input set 29 of multiplexer 23. So, address MI present in ROSPA is added to jump displacement K (which is assumed =1), is transferred on channels 38, 39 and is applied to inputs of network 22.

Command SAVE=1, suitably decoded, generates a signal $\overline{\text{FILE EN}}$ at logical level 0 and a command PUSH/POP at logical level 1. So, by timing signal STCSSA, address N+1 present in µ PCR 21 is saved or loaded into stack register 20A and address MI+1 is loaded into ROSPA 17 and ROSAR 3.

At the same time, a new address MI+2, which can be used for the following sequential addressing of the microprogram, is loaded into µ PCR 21. In case the interruption occurs during a jump microinstruction, the several addresses can be easily saved by using the several available paths. If a jump microinstruction of address N is in progress, register µ PCR 21 contains address N+1. Such address is saved into the stack by signal STCSSA (if SAVE=1) and, at the same time, µ

PCR 21 is loaded with the jump address (absolute or relative) obtained through multiplexers 19, 23, AND gate 25 and network 22 (which does not increment such jump address because an interruption has been previously recognized by signal STINTA). Always by signal STINTA, tristate circuits 24 have been locked and tristates 46 enabled, so that by STCSSA, the interrupt vector, instead of the jump address, is loaded into ROSPA and ROSAR. During the execution of the interrupt microinstruction, also the jump address contained in µ PCR 21 is then saved into stack 20. Evidently this is possible only because the interrupting microinstruction is a jump microinstruction (with saving) which does not use, for the address increment, network 22 and register µ PCR 21 as temporary store, but it uses a path different from the first one. Such different path has only a section in common with the first path and is provided with summing network 18 and with temporary storing register of the addresses (ROSPA). So, during the second phase of the cycle within which an interruption occurs, and during the first phase of the executing cycle of the first microinstruction, register µ PCR 21 can be used as temporary register of the jump address which can therefore be saved. The unconditioned relative jump microinstruction, having the format shown in FIG. 3E, is also used as return microinstruction both from interrupting microprogram and from subroutine.

7—Return from subroutine.

In such case, the last microinstruction of the microprogram is of the type shown in FIG. 4E. Field 09 (RET) is at logical level 1 and commands, when decoded, a pop operation of stack 20: the address of the following microinstruction is read out from stack 20.

8—Return from interrupting microprogram.

Every time an interruption at a certain priority level is recognized, that is, it causes a jump to an interruption treatment microprogram, a flip-flop indicating the interruption priority level is set. The flip-flops indicating the several priority levels are flip-flops 52, 53, 54.

FIG. 1B shows that a high priority interruption INT HP is transferred through AND gate 47 only if flip-flop 52 was reset. During the same machine cycle, interruption INT HP addresses the interruption treatment microprogram by means of signals STINTA (which enables AND gate 44) and by signal STCSSA. Always during the same machine cycle, flip-flop 52 is set by the falling edge of PH2, because its J input is at logical level 1. The set of flip-flop 52 locks AND gate 47 and henceforth interruption INT HP may be removed from lead 99. No other interruption occurring on lead 99 is recognized, until flip-flop 52 is set. The set of flip-flop 52 also locks gates 48 and 49 so that the interruptions having lower priority level cannot be recognized too. Likewise an intermediate priority interruption, if it is recognized, sets flip-flop 53, which inhibits, until it is set, that other subsequent interruptions having intermediate or low priority be recognized. Likewise, a low priority interruption INT BP, if recognized, sets flip-flop 54, which inhibits, until set, that other subsequent low priority interruptions be recognized. The function of the return microinstruction from interrupting microprogram is in this case double. On one side such return microinstruction commands, by field 09 (RET) at logical level 1, a pop operation of the stack and the recall from stack 20 of the lower priority microprogram address previously interrupted. On the other side it commands the transition to a lower priority level by field 14 (PC) at logical level 1. Field 14, when it is decoded, generates a microcommand EOS which is applied to K input of flip-flop 52 through lead 57, and to K input of flip-flops 53, 54 through AND gates 55 and 56 respectively. As AND gate 55 receives to its input the signal present on $\overline{Q}$ output of flip-flop 52 and AND gate 56 receives to its inputs the signals present on output $\overline{Q}$ of flip-flops 52 and 53, it is clear that EOS applies a signal at logical level 1 to input K of flip-flops 53, 54 only if flip-flop 52 is reset, as well as that EOS applies a signal at logical level 1 of input K of flip-flop 54 only if flip-flops 52, 53 reset.

Therefore, when during the execution of the microinstruction of return from interrupting microprogram timing signal PH2 falls to logical level 0, that flip-flop is reset among flip-flops 52, 53, 54 which were set.

In conclusion, the sequencer object of the invention is able to generate microprogram addresses with the possibility of inserting subroutines at the same priority level and saving microprogram addresses, as well as with the possibility of interrupting microprograms to jump to interrupting microprograms, and saving addresses and, finally, of returning from such subroutines or interrupting microprogram. This is allowed because two address generation loops having a common section and two address latch registers are provided, as well as a stack connected to one of such loops. A first loop is formed by multiplexer 23, by AND gate 25, by incrementer 22, by register µ PCR 21 and by the connection between output set of µ PCR 21 and input set 31 of multiplexer 23.

A second loop is formed by multiplexer 23, by gate sets 25 and 24, by channel 39, by register 17, by channel 40, by summing network 18, by multiplexer 19 and by the connection between the output of multiplexer 19 and input set 29 of multiplexer 23. On the first loop the stack 20 of address saving is inserted. A preferred embodiment of the invention has been described, but it is clear that several modifications can be made without departing from the scope of the invention. For instance, the use of two multiplexers 19 and 23 connected in cascade is arbitrary and is due to the advantage of using a component (sequencing unit 16) available on the market. Actually, two multiplexers 19 and 23 may be included in one multiplexer 23A, as shown in FIG. 4.

Figure 4:
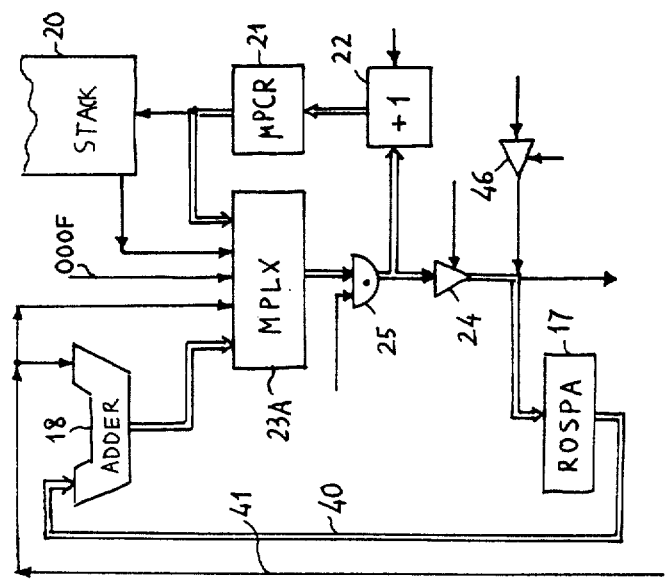
FIG. 4 shows a slightly modified form of the sequencer of FIG. 1A.

In FIG. 4 a modified embodiment of the sequencer of FIG 1A is shown. The elements corresponding to those of FIG. 1A are identified by the same reference numbers. The two address generation loops, essential for the sequencer working, are evidenced by a double line.

Figure 5:
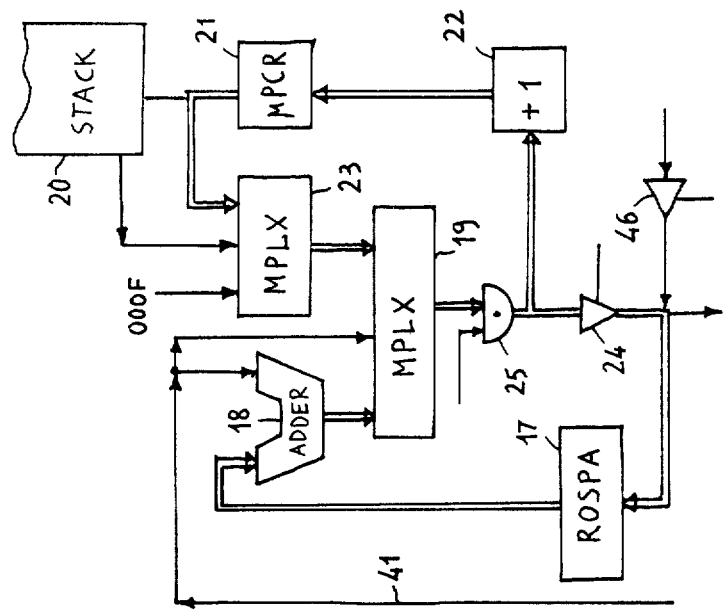
FIG. 5 shows a second modified form of the sequencer of FIG. 1A.

FIG. 5 shows a second modified embodiment of the sequencer of FIG. 1A; such modified embodiment uses two multiplexers and differs from FIG. 1A only because multiplexer 19 is downstream of multiplexer 23. Also in this figure, the elements corresponding to those of FIG. 1A are identified by the same reference numbers and the two address generation loops are evidenced by a double line. Other modifications may be made by the people skilled in the art.

For the use which is made herewith, it is specified that by "loop" or "looped communication path" it is meant a set of logical elements cascade connected with the output of one element connected to the input of the following one and with the output of the last cascade element connected to the input of the first element so as to form a closed path or loop where logical information can be recirculated.

The information flow direction in the loop establishes an upstream or downstream relation among elements if more than two elements are in the loop.

An element is upstream of another when its outputs are connected to the inputs of the other element.

We claim:

1. In the microprogrammed control unit of a data processing system comprising an addressable control memory, a timing unit for timing the operation of said control unit during subsequent machine cycles, a decoder receiving at its inputs, at each machine cycle, a microinstruction read out from said control memory, said decoder supplying microcommand outputs for controlling said control unit, sequencer means for addressing said control memory comprising:

a first loop for address circulation comprising multiplexing means, a first output node downstream said multiplexing means for outputting addresses from said loop, an incrementer having inputs connected to said output node and outputs, said incrementer being controlled to increment by one unit or to transfer unchanged an address received on its inputs; a first register having its input connected to the outputs of said incrementer, and outputs connected to a first input set of said multiplexing means, an address saving register stack having inputs coupled to the output of said first register and outputs coupled to a second input set of said multiplexing means;

a second loop for address circulation comprising a first set of gates controlled by an interruption signal and having their inputs connected to said first output node, a second output node connected to the outputs of said first set of gates for outputting addresses from said second node to said control memory, a second register having inputs connected to said second node and outputs, a summing network having a first input set connected to the outputs of said second register and a second input set connected to outputs of said control memory, said summing network having outputs connected to a third input set of said multiplexing means, said second loop comprising further said multiplexing means, said first output node in common with said first loop;

an input channel for interruption addresses connected to said second node; and a second set of gates enabled by an interruption signal and controlling said input channel.

2. Sequencer means as claimed in claim 1 wherein said multiplexing means comprises a first multiplexer having a set of inputs connected to the outputs of said summing network and a second multiplexer, said second multiplexer having a first set of inputs connected to outputs of said first multiplexer, a second set of inputs connected to the outputs of said stack and a third set of inputs connected to the outputs of said first register.

3. Sequencer means as claimed in claim 1 wherein said multiplexing means comprises a first multiplexer having a first set of inputs connected to the outputs of said first register, a second set of inputs connected to the outputs of said stack, and a second multiplexer, said second multiplexer having a first set of inputs connected to outputs of said first multiplexer and a second set of inputs connected to the outputs of said summing network.

* * * * *

UNITED STATES PATENT AND TRADEMARK OFFICE
CERTIFICATE OF CORRECTION

PATENT NO. : 4,429,361
DATED : Jan. 31, 1984
INVENTOR(S) : Tiziano Maccianti and Vittorio Zanchi It is certified that error appears in the above-identified patent and that said Letters Patent are hereby corrected as shown below:

Please change the Assignee from "Honeywell Information Systems Inc., Waltham, Mass." to --Honeywell Information Systems Italia, Milan, Italy--.

Signed and Sealed this

Eighteenth Day of December 1984

[SEAL]

*Attest:*

*Attesting Officer*

GERALD J. MOSSINGHOFF

*Commissioner of Patents and Trademarks*